May 21, 1957 H. R. SMITH ET AL 2,793,289

SYNC STRETCHER

Filed May 2, 1952 3 Sheets-Sheet 1

INVENTORS
Harry R. Smith
Allen R. Taylor,

BY

ATTORNEY

May 21, 1957 H. R. SMITH ET AL 2,793,289

SYNC STRETCHER

Filed May 2, 1952 3 Sheets-Sheet 2

INVENTORS.
Harry R. Smith
Allen R. Taylor,
BY [signature]
ATTORNEY

May 21, 1957 — H. R. SMITH ET AL — 2,793,289

SYNC STRETCHER

Filed May 2, 1952 — 3 Sheets-Sheet 3

INVENTORS
Harry R. Smith
Allen R. Taylor,
BY
ATTORNEY 2,793,289
Patented May 21, 1957

2,793,289

SYNC STRETCHER

Harry R. Smith, Verona, and Allen R. Taylor, Belleville, N. J., assignors to Standard Electronics Corporation, Newark, N. J., a corporation of Delaware Application May 2, 1952, Serial No. 285,768

3 Claims. (Cl. 250—27)

This invention relates to a video amplifier suitable for a television transmitter wherein it is desirable to control the relative strengths of the synchronizing pulses and the video portions of a composite signal.

In the operation of television transmitters, it is necessary accurately to check and control the relative strengths of the synchronizing pulses and the video portion of a composite television signal in order to insure that the signal being sent out conforms with the standards imposed by the Federal Communications Commission.

It is an object of this invention to provide such a control in the amplifier which feeds the modulator grids of a television transmitter. The control essentially comprises an amplifier stage which includes a pair of amplifier tubes to which the composite video signal is simultaneously applied. The first tube of the pair substantially linearly amplifies the entire composite signal, i. e. the synchronizing pulses and the video portion alike. The second amplifier tube of the pair is biased substantially to cut-off during the application of the video portion of the composite signal thereto, but becomes conducting when the synchronizing pulses are applied thereto. The character of the composite signal is such that the synchronizing pulses are at the maximum potential. This is accomplished by selecting as the synchronizing pulse stretcher a stage in the multi stage video amplifier wherein the polarity of the composite signal is such that the synchronizing pulses are uppermost or maximum in potential. At the input of the above described sync stretcher stage of amplification a D. C. restorer is provided in the form of a negative clamping circuit which holds the positive amplitude extremes (the peaks of the synchronizing pulses) at zero potential as a reference level. In this application a diode clamping circuit is shown, although other types of clamping circuits or base-line stabilizers are known.

In order to control the relative degree of amplification of the synchronizing pulses there is provided a means to vary the amount of bias on the amplifier tube which is normally biased to cut-off. Accordingly, the non-linear amplifier stage may be termed a variable sync stretcher.

The following is a detailed description of the invention in conjunction with a drawing, wherein.

Figure 1:
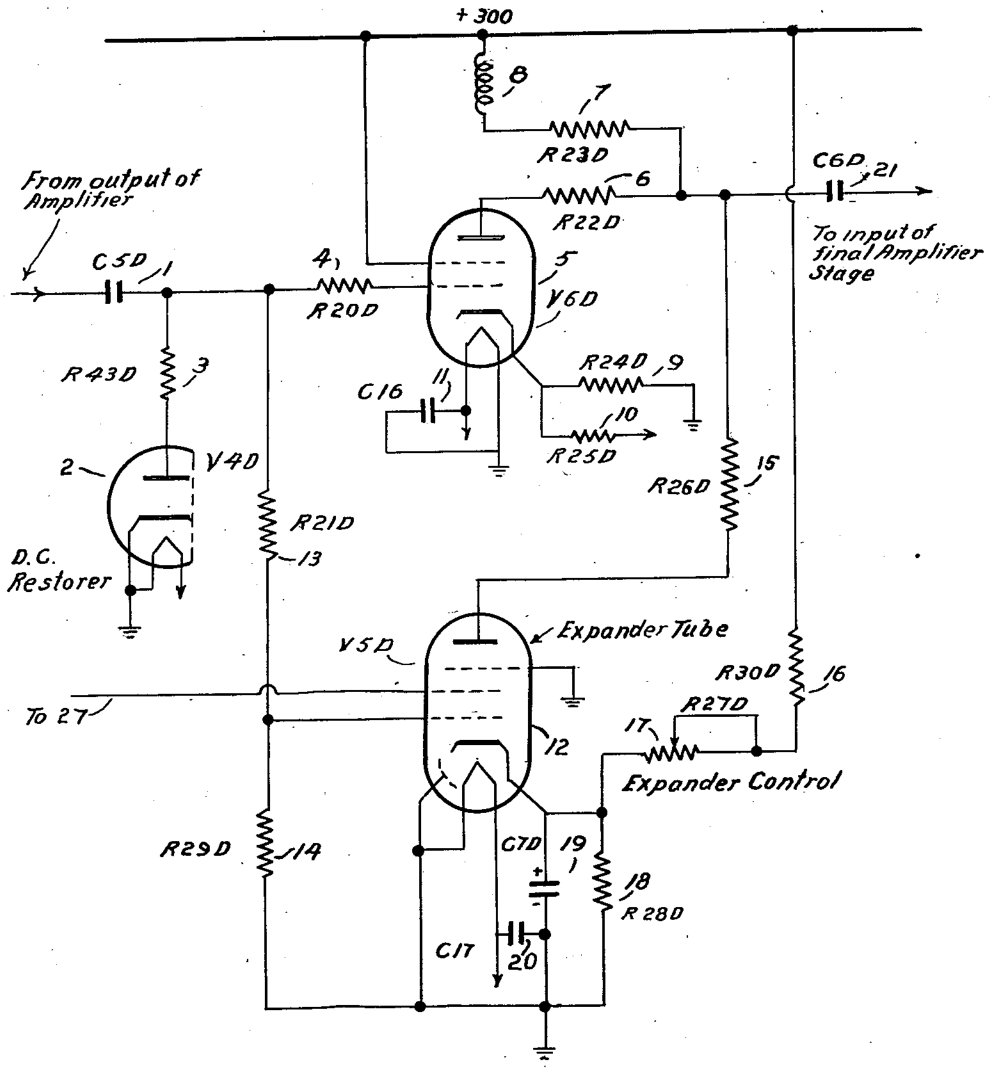
Fig. 1 shows the sync stretcher stage of a video amplifier according to this invention.
Figure 2:
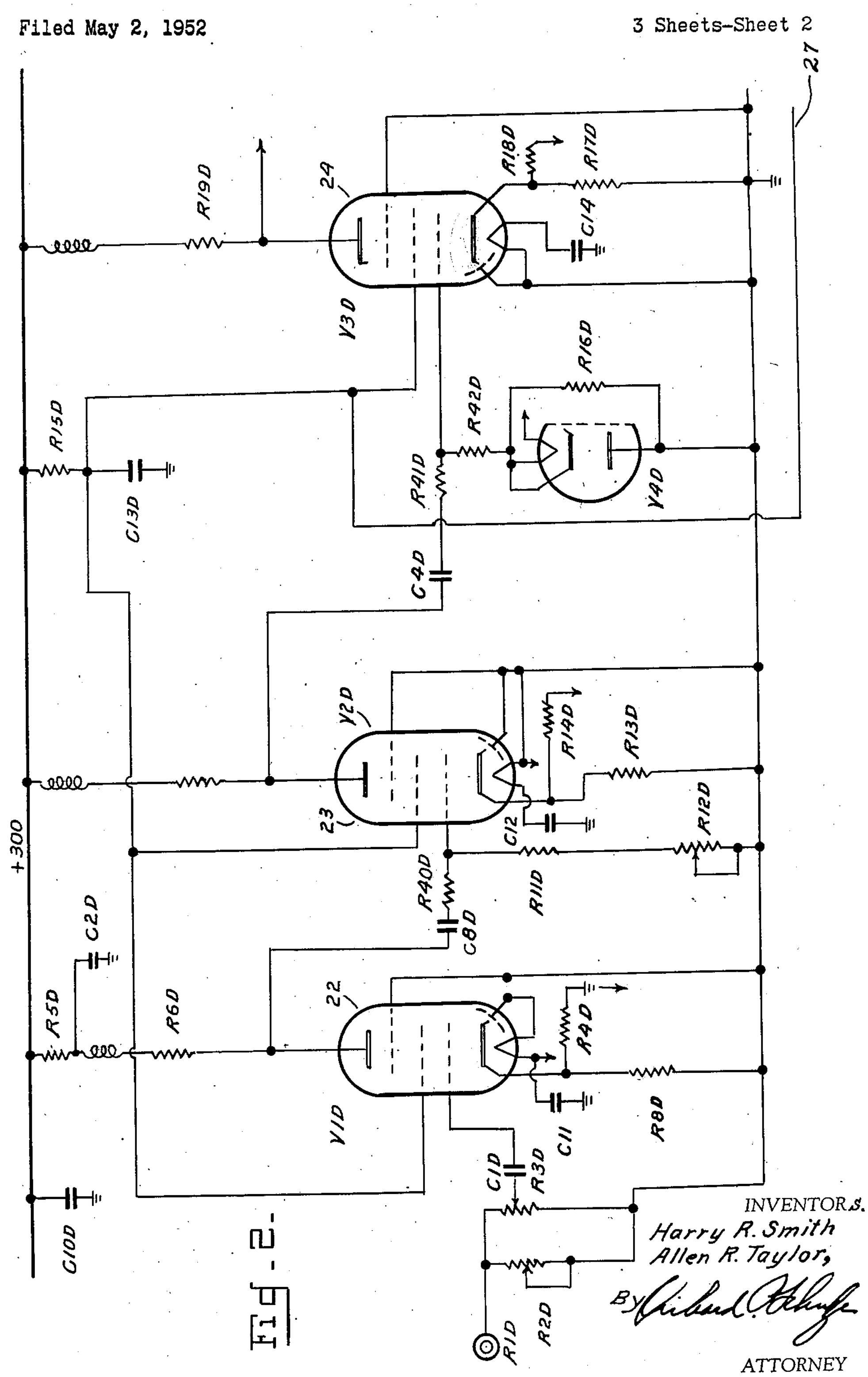
Fig. 2 shows a series of suitable preamplifier stages for use in present invention; and, Fig. 3 shows a suitable final video amplifier stage for use in the present invention.

The coupling condenser for the input of the sync stretcher stage is shown at 1 in Fig. 1. The D. C. restorer tube is diode 2 having its plate connected to the input circuit through resistor 3. The combination of condenser 1, diode 2 and resistor 3 will be recognized as a negative clamping circuit which operates in the manner well known to limit the most positive excursions of the signal to zero potential. As stated above, the number of amplification stages ahead of the sync stretcher is such that the synchronizing pulses are maximum or uppermost commonly called black positive. The function of the D. C. restorer may be briefly described by stating that the condenser 11 becomes charged to the maximum applied voltage and remains so charged so that any swing necessarily is in the negative direction, and the output voltage varies between zero and some negative value, depending on the amplitude of the input signal. The clamped signal is applied through resistor 4 to the control grid of amplifier tube 5. The plate circuit of tube 5 includes resistors 6 and 7 and inductance 8. The cathode is connected to ground through unbypassed resistor 9 and to a metering circuit through resistor 10. The filament supply is filtered at radio frequencies by condenser 11.

Figure 3:
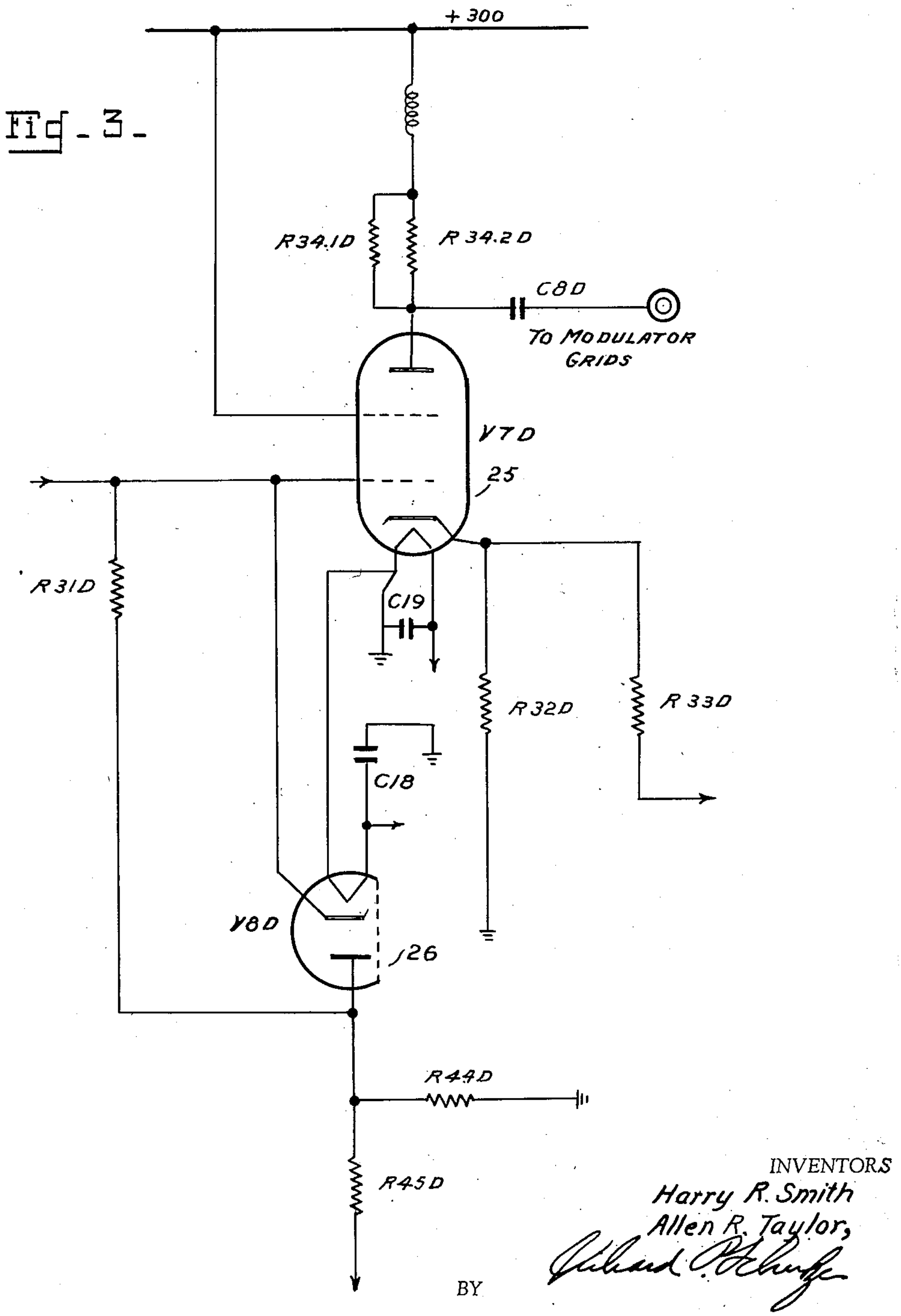

At 14 is the usual grid resistor to provide a D. C. path for the grids of 5 and 12 to ground. At 4, 13, 6 and 15 are resistors of relatively low valve which perform the usual function as parasitic suppressors (i. e. prevent unwanted oscillations). The plate of tube 12 is connected to the junction between plate resistors 6 and 7 of tube 5 through resistor 15. An adjustable bias source for tube 12 is provided in resistors 16 and 18 and variable resistor 17 which form a potential divider between the + 300 source of B supply and ground. The bias on the cathode of tube 12 can be adjusted by resistor 17. A cathode bypass condenser 19 and a filament supply filter condenser 20 are also provided. The output of the sync stretcher stage is taken from the junction of plate resistors 6, 7 and 15 and fed through condenser 21 to the input of the final amplifier stage shown in Fig. 3.

The operation of the circuit of Fig. 1 is as follows. The negatively clamped composite signal is simultaneously applied to the inputs of tubes 5 and 12. Tube 5 is a class A amplifier and linearly amplifies the entire signal. During the application of all but the synchronizing pulses of the video signal, the expander tube 12 is cut off by the bias applied thereto through 16, 17 and 18. When, however, the synchronizing pulses are applied, being at the most maximum potential, the cut off bias is overcome and plate current flows in tube 12. Since resistor 7 and inductance 8 are output impedances common to both of tubes 5 and 12 it will be seen that the plate currents of both tubes combine therethrough during the application of synchronizing pulses. The result is that the synchronizing pulses are amplified more than the rest of the composite signal. Moreover, the amount of such relative amplification or sync stretching may be controlled by varying resistor 17. Three stages of amplification in the form of tubes 22, 23 and 24 are provided ahead of the sync stretcher stage to give the desired signal amplitude and polarity as described above. The final amplifier stage includes an additional amplifier tube 25 preceded by a D. C. restorer in the form of a positive clamping circuit in diode 26 connected so that the signal is applied to the cathode thereof.

The plate of clamping diode 2 is connected to the inputs of amplifiers 5 and 12 by direct current conducting means which include resistors 4 and 13. This insures that the synchronizing signal component supplied by amplifier 12 and added to the linearly amplified composite signal supplied by amplifier 5 in the common output impedance 7 and 8 will be independent of the picture content, or average brightness of the composite signal. The amount of sync stretching accomplished by the amplifier is therefore dependent solely upon the setting of the expander control 17.

Although the invention is, of course, not limited to the specific circuit shown, nor to particular values of circuit components, the following values have been found to produce a satisfactory video amplifier in accordance with this invention:

*Resistors*

| | |
|---|---|
| R1D | 220 ohms |
| R2D | 250 ohms |
| R3D | 100 ohms |
| R5D | 5,000 ohms, 10 W |
| R6D | 820 ohms, 2 W (±5%). |
| R7D | 1,000,000 ohms |
| R8D | 51 ohms, 2 W |
| R9D | 10,000 ohms |
| R10D | 1,000 ohms, 5 W |
| R11D | 10,000 ohms |
| R12D | 50,000 ohms, 2 W |
| R13D | 100 ohms, 2 W |
| R14D | 10,000 ohms |
| R15D | 50,000 ohms, 10 W |
| R16D | 1,000,000 ohms |
| R17D | 220 ohms, 2 W |
| R18D | 10,000 ohms |
| R19D | 900 ohms, 5 W |
| R20D | 47 ohms, 1 W |
| R21D | 2,000 ohms (±1%) |
| R22D | 10 ohms |
| R23D | 1,000 ohms, 10 W |
| R24D | 150 ohms, 5 W |
| R25D | 39,000 ohms (± 5%) |
| R26D | 10 ohms |
| R27D | 50,000 ohms, 4 W |
| R28D | 1,000 ohms |
| R29D | 1,000,000 ohms |
| R30D | 30,000 ohms, 3 W |
| R31D | 1,000,000 ohms |
| R32D | 250 ohms, 10 W |
| R33D | 100,000 ohms, 1 W (±5%) |
| R34.1D | 2,500 ohms, 10 W |
| R34.2D | 2,500 ohms, 10 W |
| R41D | 100 ohms, 1 W |
| R42D | 10,000 ohms |
| R43D | 10,000 ohms |
| R44D | 4,700 ohms |
| R45D | 20,000 ohms, 5 W |

*Condensors*

| | |
|---|---|
| C1D | .5 mfd., 600 v. |
| C2D | 10 mfd., 600 v. |
| C3D | .5 mfd., 600 v. |
| C4D | .5 mfd., 600 v. |
| C5D | .5 mfd., 600 v. |
| C6D | 1.0 mfd., 600 v. |
| C7D | 1,000 mfd., 50 v. |
| C8D | 2.0 mfd., 600 v. |
| C10D | 1.0 mfd., 600 v. |
| C11 | .001 mfd. |
| C12 | .001 mfd. |
| C13D | 80 mfd., 450 v. |
| C14 | .001 mfd. |
| C16 | .001 mfd. |
| C17 | .001 mfd |
| C18 | .001 mfd. |
| C19 | .001 mfd. |

*Tubes*

| | |
|---|---|
| V1D | 6AG7 |
| V2D | 6AG7 |
| V3D | 6AG7 |
| V4D | 6AL5 |
| V5D | 6AG7 |
| V6D | 6BG6 |
| V7D | 6BG6 |
| V8D | ½6AL5 |

We claim:

1. A video amplifier comprising in combination a direct current restorer which consists of a negative clamping circuit to which an unclamped composite signal is applied, said composite signal comprising a video portion, the positive potentials of which correspond to black picture content and synchronizing pulses, said synchronizing pulses being at a higher potential than said video portion, said negative clamping circuit having a rectifying element so poled as to limit the most positive excursions of the composite signal substantially to zero potential, first and second amplifier tubes each having a cathode, a control grid, and a plate, direct current conducting means conducting the composite signal proceeding from said negative clamping circuit to the control grid of said first amplifier tube, which substantially linearly amplifies the same, and also to the control grid of said second amplifier tube, circuit and potential means to operate said first amplifier tube substantially as a class A amplifier, direct current conducting means applying a bias between the cathode and control grid of said second amplifier tube which substantially cuts off plate current flow therethrough during the application of all of said composite signal thereto except said synchronizing pulses, the plates of said first and second amplifier tubes being connected to an output circuit such that the amplification of said video amplifier increases during the application of said synchronizing pulses.

2. A video amplifier comprising in combination first and second amplifier tubes each having a cathode, a control grid and a plate, a negative clamping circuit comprising a diode having a plate and a cathode across which the input to said video amplifier is applied, direct current conducting means connecting the plate of said diode to the control grid of each of said first and second amplifier tubes, adjustable bias means for said second amplifier tube biasing the control grid of the latter negative with respect to the cathode thereof by an amount sufficient substantially to cut off plate current flow therethrough for input signals below a predetermined amplitude appearing on the plate of said diode, the plates of said first and second amplifier tubes being connected to a source of direct current potential through a common load impedance.

3. A video amplifier comprising in combination first and second amplifier tubes each having a cathode, a control grid and a plate, a negative clamping circuit across which the input to said video amplifier is applied, said negative clamping circuit comprising a rectifying element so poled as to limit positive excursions of the signal proceeding therefrom substantially to zero potential, direct current conducting means connecting said negative clamping circuit to the control grid of each of said first and second amplifier tubes, adjustable bias means for said second amplifier tube biasing the control grid of the latter negative with respect to the cathode thereof by an amount sufficient substantially to cut off plate current flow therethrough for input signals below a predetermined amplitude applied across said negative clamping circuit, the plates of said first and second amplifier tubes being connected to a source of direct current potential through a common load impedance.

References Cited in the file of this patent

UNITED STATES PATENTS

| | | |
|---|---|---|
| 2,240,605 | Bingley | May 6, 1941 |
| 2,293,528 | Barco et al. | Aug. 18, 1942 |
| 2,300,189 | Wolff | Oct. 27, 1942 |
| 2,515,763 | Downie | July 18, 1950 |
| 2,552,588 | Reeves | May 15, 1951 |
| 2,610,260 | Moffett | Sept. 9, 1952 |
| 2,692,333 | Holmes | Oct. 19, 1954 |

FOREIGN PATENTS

| | | |
|---|---|---|
| 571,776 | Great Britain | Sept. 7, 1945 |

OTHER REFERENCES

"Elements of Television Systems," by George E. Anner, published by Prentice-Hall, Inc., 1951, page 510.